Oct. 20, 1964   J. L. MARGAROLI ETAL   3,153,473
MACHINE FOR FEEDING DATES TO A PITTING MACHINE
Original Filed March 29, 1957   4 Sheets-Sheet 4
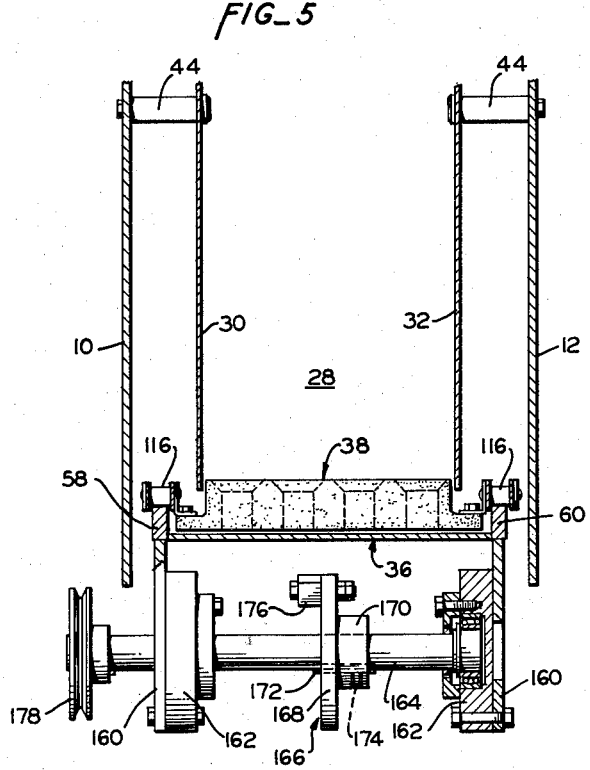
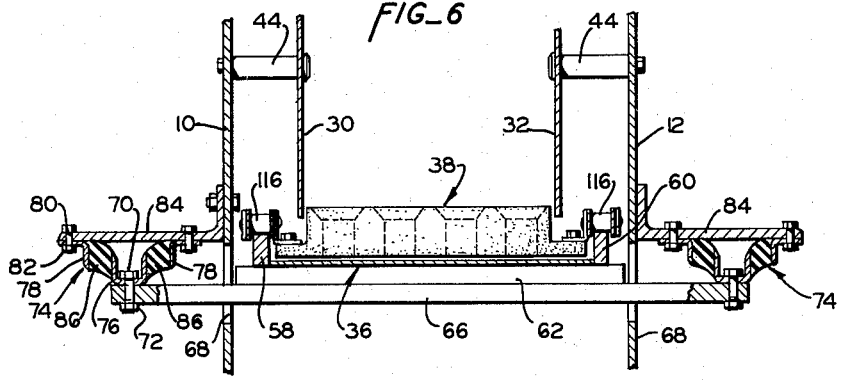
INVENTORS
EARL J. HESSE
JOHN L. MARGAROLI
BY
ATTORNEYS

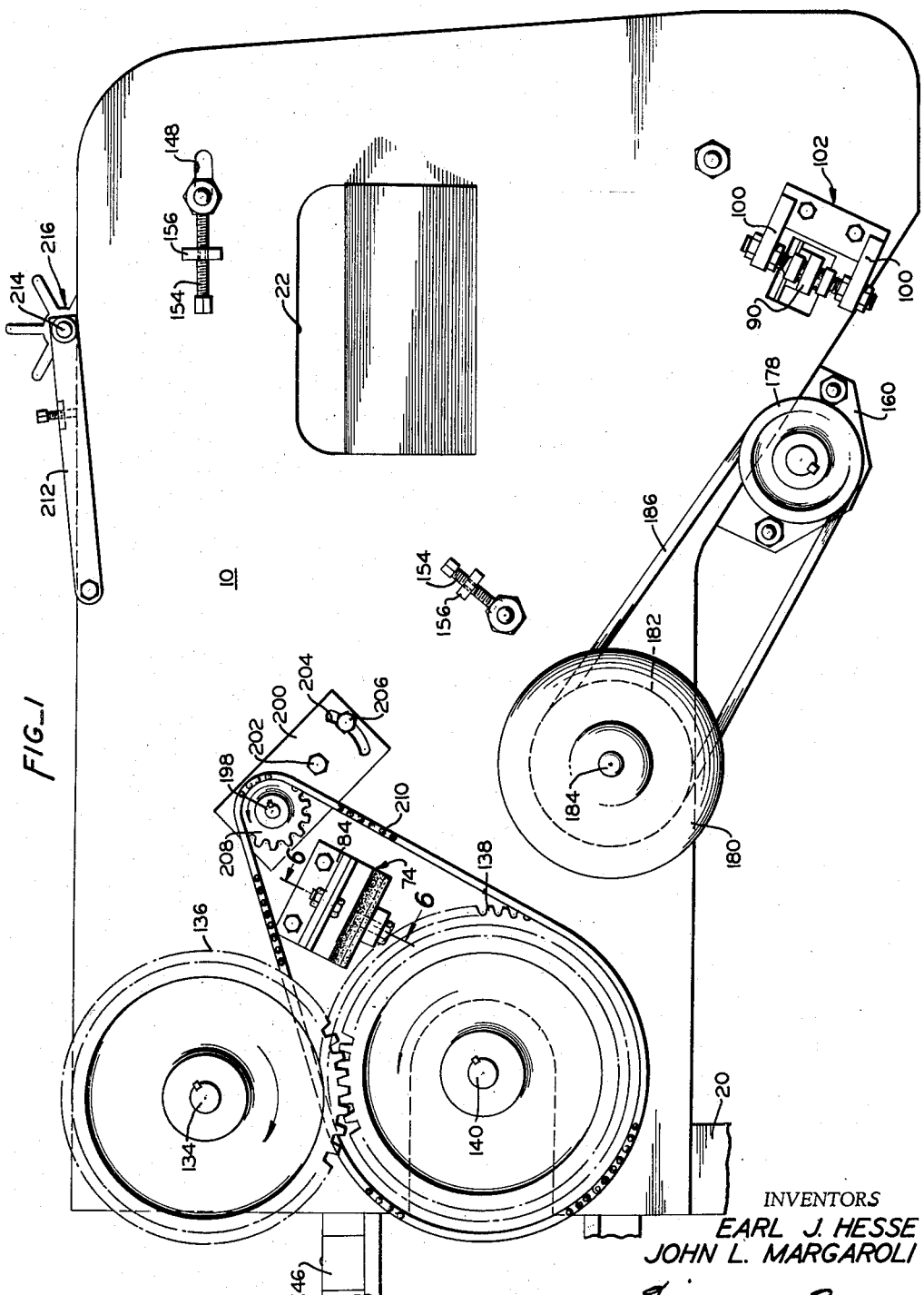

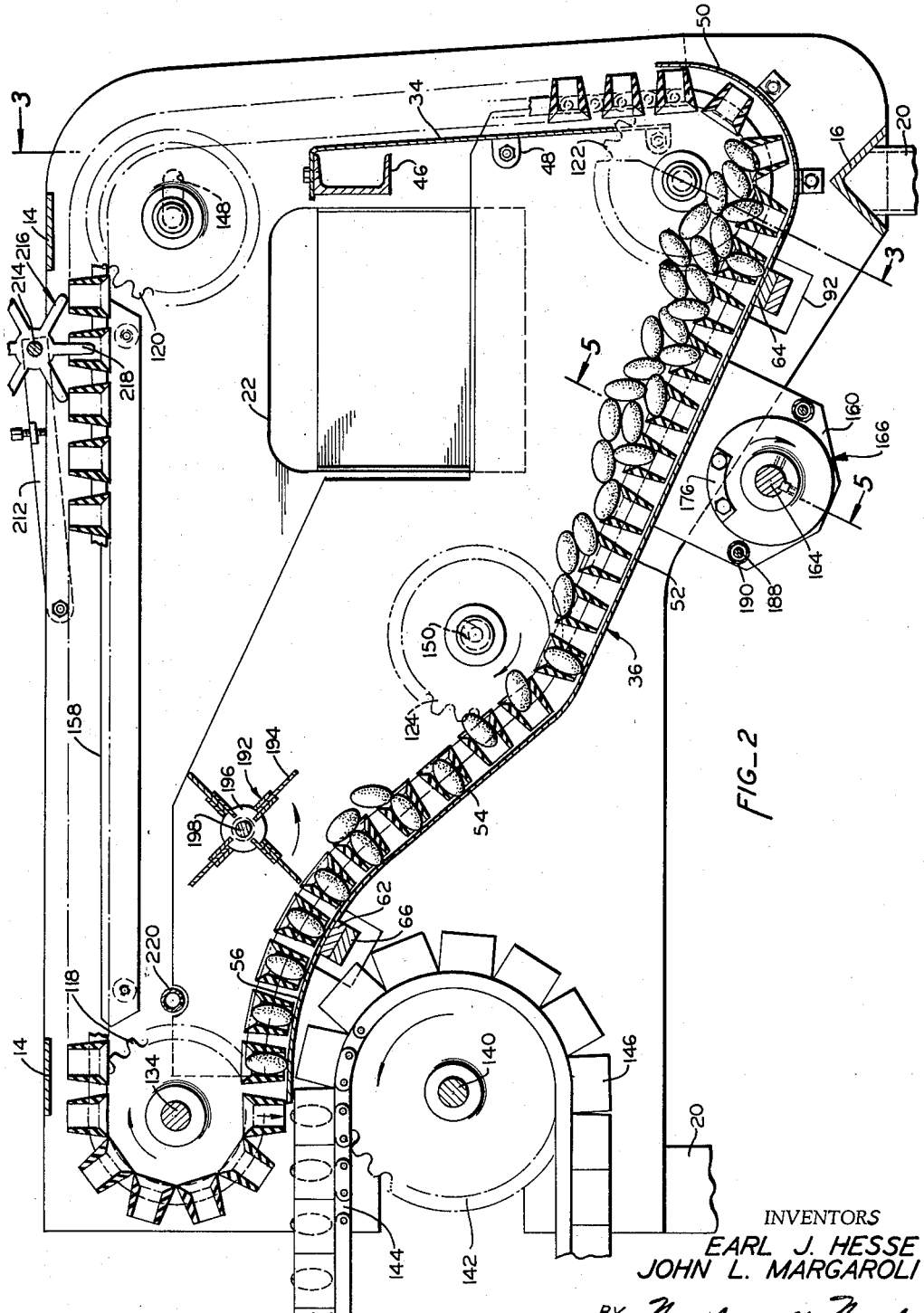

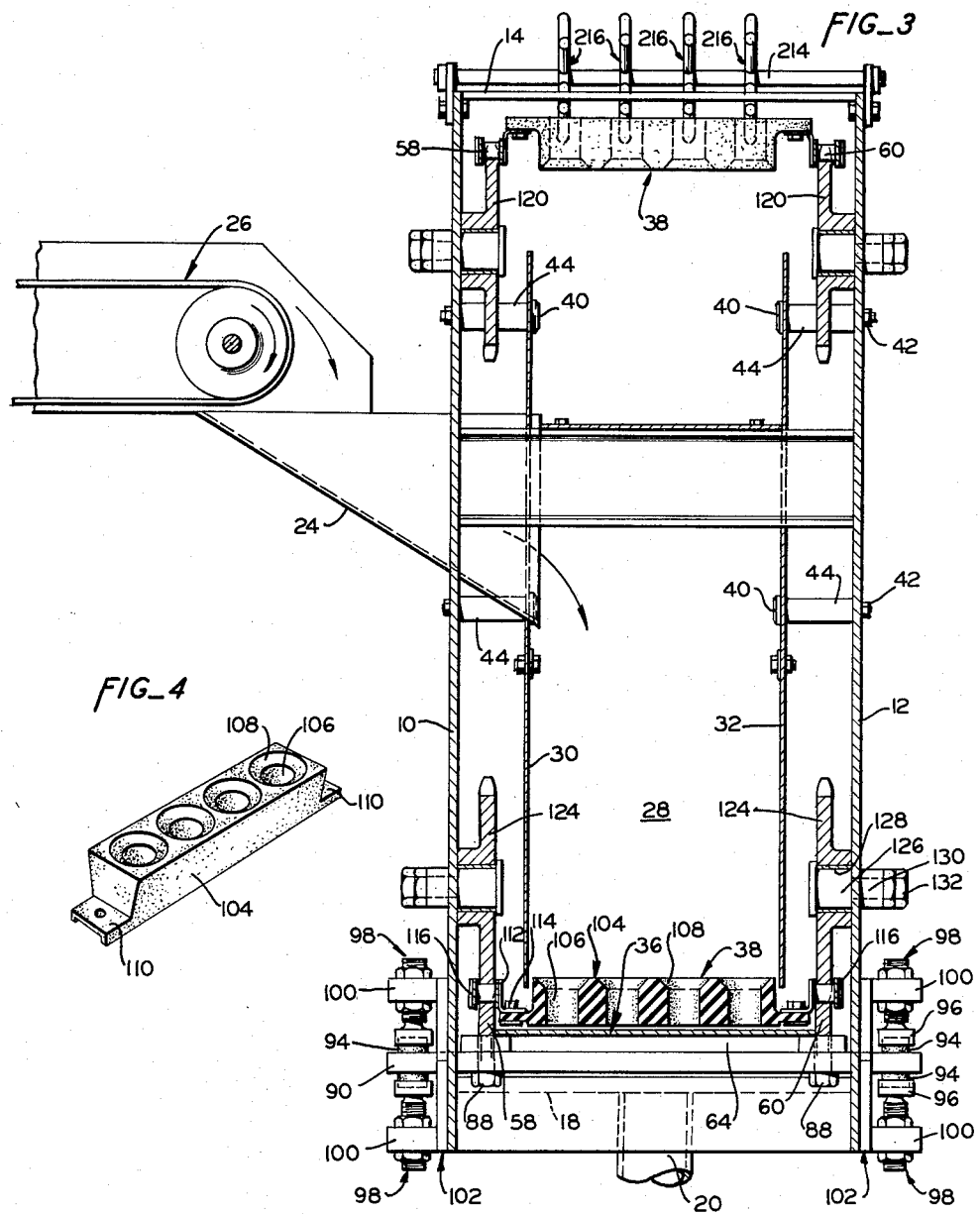

United States Patent Office 3,153,473
Patented Oct. 20, 1964

3,153,473
MACHINE FOR FEEDING DATES TO A PITTING MACHINE
John L. Margaroli and Earl J. Hesse, Oakland, Calif., assignors to George W. Ashlock Company, Oakland, Calif., a corporation of California
Continuation of abandoned application Ser. No. 647,130, Mar. 29, 1957. This application Feb. 26, 1964, Ser. No. 347,616
4 Claims. (Cl. 198—33)

This invention relates to fruit handling equipment, and more particularly to a machine which is specifically adapted for the feeding of dates from a feed hopper to a pitting machine. The subject machine is, of course, not limited to use with dates, being adapted to be used as feeder equipment with other fruit having both a major axis and a minor axis, such as olives of the somewhat elongated variety, but it is particularly useful and efficient in connection with fruit, like dates, which tend to stick together and resist free movement into individual conveyor pockets.

This application is a continuation of our copending application Serial No. 647,130, filed March 29, 1957, now abandoned.

The essential object of the invention is to provide an improved pocket-type conveyor for dates, and the like, which is considerably more efficient than presently known or available machines suitable for this purpose in the sense that a considerably higher percentage of the pockets of the subject feeder conveyor are caused to be filled with dates upon passing through the hopper than is the case with prior date feeding machines.

This and other objects and advantages of the invention will be apparent from the following description taken in conjunction with the drawings forming part of this specification, and in which:

FIGURE 1 is a view in side elevation of the subject date feeder machine;

FIGURE 2 taken from the same side of the machine as FIGURE 1, but with the side plate removed and with parts of the machine shown in section for purposes of clarity with respect to the date pick-up and feeding operation;

FIGURE 3 is a view taken along lines 3—3 of FIGURE 2;

FIGURE 4 is a view in perspective of one of the multi-pocket conveyor elements;

FIGURE 5 is a detail view in section taken along lines 5—5 of FIGURE 2; and

FIGURE 6 is a detail view in section taken along lines 6—6 of FIGURE 1.

With reference to the drawings, the machine has a supporting framework comprising a pair of spaced apart parallel side plates 10 and 12, a plurality of cross members, such as 14, 16 and 18, interconnecting the side plates 10 and 12 together, and legs 20 secured to and depending from the lower cross members 16 and 18. Side plate 10 is provided with a relatively large feed opening 22 out of which there extends a feed chute 24. The chute 24 may be fed by a feed conveyor, such as that indicated generally by 26 in FIGURE 3. The open inner end of chute 24 is in communication with a feed chamber, or hopper, 28 which is defined by hopper side plates 30 and 32, back plate 34, bottom plate 36, and a pocket conveyor 38 which, among other things, serves to laterally block the space between the lower ends of the hopper side plates 30 and 32 and bottom plate 36 (FIGURE 3). The side plates 30 and 32 are secured to the frame side plates 10 and 12 by means comprising studs 40, nuts 42, and spacer sleeves 44. The hopper back plate 34 is secured to and depends from a transversely disposed frame member 46 and is attached to the hopper side plates 30 and 32 by means comprising tab brackets 48.

The bottom, or skid, plate, 36 is provided with a rearward portion 50 which is upwardly curved, an intermediate portion 52 which is inclined upwardly in the forward direction, another intermediate portion 54 which is inclined upwardly in the forward direction to a substantially greater degree than is portion 52, and an arcuate terminal portion 56 which terminates in a horizontal plane. The skid plate 36 is secured to and between a pair of conveyor chain support rails 58 and 60. This skid plate and rail assembly is secured adjacent its upper and lower ends to transverse bar members 62 and 64 which are disposed wholly between the frame side plates 10 and 12.

Upper bar member 62 is fixedly secured to a bar member 66 which protrudes through openings 68 formed in frame side plates 10 and 12 and which has the ends thereof secured, as by bolts 70 and nuts 72, to vibration dampener members 74. The dampener members 74 comprise a centrally disposed U-shaped metal member 76 through which the bolt 70 extends, outer L-shaped metal members 78 secured, as by bolts 80 and nuts 82, to a bracket support 84 which is fixedly secured to a frame side plate, and intermediate rubber elements 86 which are bonded to the metal elements 76 and 78. The lower bar member 64 is fixedly secured, as by screws 88, to a bar 90 which has its ends protruding through apertures 92 formed in the frame side plates 10 and 12. The ends of the bar 90 are disposed between rubber pads 94 which are socketed in the counter sunk heads 96 of bolts 98. The bolts 98 extend through the arms 100 of bracket support members 102 which are fixedly secured to frame sides 10 and 12.

The conveyor 38 comprises a plurality of closely spaced apart and parallel rubber bar members 104, each of which is provided with a plurality of open ended date-receiving pockets 106 having enlarged inverted frusto-conical upper ends 108, lugs 110 formed on bar members 104, L-shaped cleats 112 secured by means comprising bolts 114 to the bar member lugs 110 and secured, as by welding, to conveyor chains 116, the lower reaches of which are guidably supported on rails 58 and 60, and pairs of opposed toothed sprockets 118, 120, 122, and 124 around which the chains 116 are trained. The sprocket pairs 120, 122 and 124 are rotatably carried by frame side plates 10 and 12 by means comprising studs 126, bearing sleeves 128 mounted thereon and supporting the sprockets, spacer sleeves 130 disposed on the reduced threaded end portions of the studs 126, and nuts 132 secured to the studs. The sprocket pair 118 is fixedly secured to shaft 134 which is journalled for rotation in suitable bearing members carried by the frame side plates. The shaft 134 is provided outwardly of side plate 10 with a gear wheel 136 which is keyed to the shaft. The gear wheel 136 is disposed in mesh with an alike gear wheel 138 which is keyed to a shaft 140 suitably journalled in bearing members carried by the frame side plates. Fixedly disposed on shaft 140 between the side plates 10 and 12 is a sprocket pair 142 which is in mesh with conveyor chains 144. The chains 144 carry pitting chuck members 146. It will be observed that the feed conveyor 38 is driven by the pitting chuck conveyor and in timed relation therewith by virtue of the meshed relation of gear wheels 136 and 138. The studs 126 carrying the sprocket pairs 120 and 124 extend through elongated apertures, or slots, 148 and 150 formed in the frame side plates 10 and 12, thereby enabling the sprocket pairs 120 and 124 to be positionally adjusted to properly tension, or take up any slack in, the conveyor chains 116. Adjustable set screws 154 carried by ears 156 secured to the frame side plates bear against the studs 126 and, in conjunction with the tension of the conveyor chains 116, control the position of these studs. A pair of rails 158 secured to the frame side plates 10 and 12 in inwardly spaced relation therefrom serve to support the upper reaches of conveyor chains 116 between the sprocket pairs 118 and 120.

The machine is provided with means for imparting a high frequency of vibration to the skid plate and rail assembly 36, 58 and 60, said means comprising: a pair of brackets 160 secured to and depending from the rails 58 and 60 adjacent the lower end thereof; bearing journals 162 secured to the brackets 160; a shaft 164 mounted for rotation in bearing units 162; a fly wheel 166 comprised of a disc portion 168 and a hub 170 secured against movement relative to shaft 164, as by key and set screw means 172 and 174, said disc portion 168 having removably secured thereto a weight member 176; a sheave 178 fixedly secured to shaft 164 outwardly of frame plate 10; an electric motor 180 mounted on frame plate 10 and having a sheave 182 secured to its output shaft 184; and a V-belt 186 trained around the sheaves 178 and 182. The brackets 160 are mutually braced and secured together by means comprising bolt rods 188 and spacer sleeves 190 disposed thereon.

The operation of the subject feeder machine is a follows. Dates are fed into the hopper chamber 28 through the chute 24, either by hand or by such as the supply conveyor 26 shown in FIGURE 3. The pitting chuck conveyor is set in motion to drive the feed conveyor 38 through the gear wheel connection 136–138. The electric motor 180 is energized and the shaft 164 is thereby rotated at a preferred velocity of approximately 1800 r.p.m. The rapidly rotating off-center weight 176 carried by the fly wheel 166 imparts a rapid oscillatory vibration to the skid plate and rail assembly 36, 58 and 60. The combined up and down and to and fro movement of this assembly is permitted by the resilient mounting for the lower end of the assembly comprised of the rubber pads 94 and the resiliently pivotal connection between the upper end of the assembly and the frame comprising the rubber element 86 of the vibration dampeners 74. Thus, the vibratory movement of the pocket conveyor is both up and down and to and fro, and this vibratory movement decreases in amplitude progressively from the bottom to the top of the skid plate since the pivotal connection at the rubber element 86 is adjacent to the upper end of the skid plate.

The preferred angle of inclination of the intermediate portion 52 of the skid plate with the horizontal is approximately 25°. Suitable results are obtained within the approximate range of 20–30°. By the time the dates are carried by the conveyor to the upper end of this portion 52 of the skid plate, the majority of them have become oriented full length within the conveyor pockets 106. The difficulties involved in so orienting the dates within the pockets provided by the elongated form of the dates and the tendency of them to stick and cling together are overcome by the combination of the angular inclination of skid plate portion 52, the rapid vibratory movement imparted to the skid plate, and the outwardly flared mouths 108 of the pockets 106.

The preferred angle of inclination of skid plate portion 54 with respect to the horizontal is approximately 50°. Suitable results are obtained within the approximate range of 45–55°. While some of the dates which have not become fully seated within the conveyor pockets are shaken down into full length occupancy of the pockets in this intermediate portion 54 of the skid plate, very little date orientation is both initiated and completed along this portion of the skid plate. The increased pitch of the skid portion 54 with respect to that of skid plate portion 52 is essentially for the purpose of causing the surplus dates for which there are not available conveyor pockets to gravitate downwardly by themselves toward the lower end of the hopper, and this increased pitch cooperates with the reduction in vibration amplitude in the area of increased pitch to provide maximum gravitationally movement of surplus dates and minimum loss of already oriented dates from the conveyor pockets.

To insure that no unpocketed dates will be delivered out of the hopper by the conveyor, the paddle wheel 192 is provided. This wheel is provided with four equi-spaced paddle blades 194 having a length equal to the width of the pocket conveyor. The blades are fixedly secured to a hub member 196 which in turn is fixedly secured to a shaft 198. The shaft 198 extends through apertures formed in the hopper side plates 30 and 32 and is journalled for rotation in plate members 200 which are pivotally secured to frame side plates 10 and 12, as by bolts 202. The shaft 198 extends through enlarged openings, not shown, formed in plates 10 and 12, thereby allowing the shaft to be adjustably positioned by pivotal movement of the plates 200 with respect to pivot bolts 202. The plates are provided with arcuate slots 204 and set bolts 206 extend therethrough and into secured relation with the side plates 10 and 12 to fixedly position the plates 200 in the desired position of adjustment. One end of shaft 198 has fixedly secured thereto a sprocket 208. A drive chain 210 is trained around sprocket 208 and around a sprocket ring formed on gear wheel 138 inwardly of the gear teeth which engage gear wheel 136. The adjustable mounting of shaft 198 permits the removal of slack from drive chain 210 and adjustment of the tension thereof. By the means described, the paddle wheel 192 is rotated in timed relation with the movement of feed conveyor 38, and the movement relation between the two is such as to prevent any unpocketed dates from passing by the paddle wheel 192.

As the conveyor members 104 pass beyond the end of skid plate portion 56 to, in effect, open the lower ends of the pockets 106, the dates drop downwardly into the pockets of members 146 of the pitting chuck conveyor. The vibratory motion of the skid plate and conveyor chain rail assembly is sufficient to dislodge from the pockets the great majority of those dates which have a tendency to hang up in the pockets. On occasion, however, dates will hang up in the conveyor pockets and be carried around the driver sprockets 118 and along the upper reach of the conveyor. Means are provided to insure that such dates will be dislodged from the pockets to fall into the hopper chamber 28. Said means comprise a pair of spaced arms 212 pivotally attached at one end to the frame plates 10 and 12 and having disposed between their other ends a shaft 214. On shaft 214 there is mounted a plurality of finger wheels 216 having a plurality of radially extending and angularly spaced fingers 218. A finger wheel 216 is provided for and is mounted above each longitudinal row of pockets of the conveyor 38. The wheels 216 are caused to rotate by engagement of the fingers 218 within the conveyor pockets, and this related movement between the conveyor and the wheels 216 insures that any dates within the upper reach of the conveyor will be dislodged therefrom.

The machine is further provided with an apertured water spray line 220 which extends transversely of the conveyor and is adapted to spray water onto the conveyor and the skid plate 36 therebeneath to lubricate both the conveyor pockets and the skid plate to promote the ease of movement between the dates and the conveyor pockets and skid plate.

It will be appreciated that both the rate and amplitude of vibration imparted to the skid plate and rail assembly can be varied, respectively, by varying the speed of operation motor 180, by increasing or decreasing the effective thickness of the weight member 176 carried by fly wheel 166, and, most conveniently, by adjustment of the bolts 98 toward or away from each other.

It is pointed out that the pitting chuck conveyor which receives the dates from the feed conveyor 38 can itself be routed to travel through the feed hopper to receive in the first instance the dates to be pitted, thereby eliminating the need for a separate feed conveyor. In such event, that portion of the pitting chuck conveyor which serves as the feed conveyor would be supported and vibrated in the same or substantially similar manner as that which has been described for the lower reach of the feed conveyor 38.

Prior known date feed conveyors of the type shown in Ashlock Patents 2,604,131 and 2,668,613 contain pockets which receive the dates in horizontal positions. About 50–60% of the pockets of such feed conveyors pick up dates. The subject date feed conveyor has a pocket pick-up efficiency about 50% greater than that of such prior conveyors, i.e. from 75% to 90% of the pockets are filled.

While a preferred embodiment of the invention has been shown and described, it is to be understood that all substantial equivalents thereof are considered to be within the spirit and scope of the invention.

What is claimed is:

1. A machine adapted to orient dates and the like, which are haphazardly grouped together, into a position where they are separated from each other and similarly positioned with their major axes vertically disposed and to feed said dates to a pitting device comprising a hopper to contain haphazardly grouped together dates, a continuous path conveyor having a reach upwardly inclined in the direction of conveyor travel extending through said hopper along the bottom thereof, said conveyor being formed of a plurality of interconnected members having flared mouth pockets adapted to admit a date lengthwise and support it in that position, rigid support means for said reach of said conveyor, vibration inducing means connected to said support means for imparting to said conveyor reach to and fro and up and down vibratory movement, and mounting means for said support means including upper mounting means engaging said support means adjacent to the upper end of said conveyor reach for permitting pivotal movement of said support means about a generally horizontal axis adjacent to said upper mounting means, and lower mounting means engaging said support means adjacent to a portion of said conveyor reach below the upper end thereof for permitting swinging movement of said support means about said generally horizontal axis, whereby said mounting means and said vibration inducing means provide vibratory movement of said conveyor reach which decreases in amplitude progressively from the bottom of said reach to the top of said reach.

2. A machine according to claim 1, said reach of said conveyor having its lowermost portion within said hopper inclined to the horizontal at an angle within the approximate range of 20–30° and having an intermediate portion which is upwardly inclined in the direction of travel thereof at an angle with respect to the horizontal, within the approximate range of 45–55°, and said reach having an uppermost portion which terminates in a horizontal attitude.

3. A machine of the type described comprising a pair of interconnected and supported vertically disposed and parallel, spaced apart frame plates, a plurality of pairs of sprockets mounted for rotation between said plates, a pair of continuous chains trained around said sprockets, a plurality of bar members disposed in closely and evenly spaced relation with each other and mutually secured to said chains to form a conveyor, a plurality of open-ended pockets formed in each bar member, means for driving said sprockets in one direction of rotation, said conveyor having a lower reach which is upwardly inclined in the direction of movement of said conveyor a pair of support rails for said chains along said lower reach, a skid plate secured to said rails and disposed in immediately underlying relation to the bar members of said lower reach, means interconnecting the upper end of said skid plate and rail assembly to said frame plates including vibration dampening means enabling yielding pivotal movement of said skid plate and rail assembly, means interconnecting the lower end of said skid plate and rail assembly to said frame plate including resilient means permitting vibratory movement of said assembly, means carried by said skid plate and rail assembly operable to impart movement to said assembly, and wall members carried by said frame plates inwardly thereof, said wall members defining with the lower reach of said conveyor and said skid plate a hopper.

4. A machine in accordance with claim 3, said conveyor having a horizontally disposed upper reach disposed above said hopper and a substantially vertically disposed reach extending into said hopper, said lower reach consisting of a lowermost portion having a predetermined degree of upward inclination which is substantially less than 40°, an intermediate portion having a predetermined degree of upward inclination which is substantially greater than 40°, and an uppermost portion which curves into a horizontal position at the end of said skid plate.

References Cited by the Examiner
UNITED STATES PATENTS

| | | | |
|---|---|---|---|
| Re. 21,015 | 2/39 | Dilger | 198—30 |
| 2,190,970 | 2/40 | Ashlock | 198—33 |
| 2,387,709 | 10/45 | Ashlock | 198—33 |

SAMUEL F. COLEMAN, *Acting Primary Examiner.*

EDWARD A. SROKA, *Examiner.*